(12) United States Patent
Hartenstine et al.

(10) Patent No.: US 8,276,988 B2
(45) Date of Patent: Oct. 2, 2012

(54) CHILD CAR SEAT

(75) Inventors: Curtis M. Hartenstine, Birdsboro, PA (US); Gregory S. Sellers, Christiana, PA (US); Sharon A. Gillett, Salem, OR (US); Robert E. Haut, West Chester, PA (US)

(73) Assignee: Wonderland Nurserygoods Co., Ltd., Taipei (TW)

( * ) Notice: Subject to any disclaimer, the term of this patent is extended or adjusted under 35 U.S.C. 154(b) by 287 days.

(21) Appl. No.: 12/490,919

(22) Filed: Jun. 24, 2009

(65) Prior Publication Data
US 2009/0322131 A1 Dec. 31, 2009

Related U.S. Application Data

(60) Provisional application No. 61/075,337, filed on Jun. 25, 2008.

(51) Int. Cl.
*A47C 1/00* (2006.01)
*B60R 22/00* (2006.01)
(52) U.S. Cl. .................... 297/250.1; 297/256.1; 297/484
(58) Field of Classification Search ............... 297/250.1, 297/256.1, 256.13, 255
See application file for complete search history.

(56) References Cited

U.S. PATENT DOCUMENTS

| 4,632,456 | A | 12/1986 | Kassai |
| 4,754,999 | A | 7/1988 | Kain |
| 5,181,761 | A | 1/1993 | Meeker |
| 5,609,393 | A | 3/1997 | Meeker et al. |
| 5,746,478 | A | 5/1998 | Lumley et al. |
| 5,845,967 | A | 12/1998 | Kane et al. |
| 5,845,968 | A | 12/1998 | Lovie |
| 6,155,638 | A * | 12/2000 | Bapst .......................... 297/250.1 |
| 6,428,099 | B1 | 8/2002 | Kain |
| 6,554,358 | B2 | 4/2003 | Kain |
| 6,623,074 | B2 * | 9/2003 | Asbach et al. .............. 297/250.1 |
| 6,682,143 | B2 | 1/2004 | Amirault et al. |
| 7,131,692 | B2 * | 11/2006 | Huang ......................... 297/250.1 |
| 7,232,185 | B2 * | 6/2007 | Hartenstine et al. ......... 297/250.1 |
| 7,246,855 | B2 * | 7/2007 | Langmaid et al. ......... 297/256.13 |
| 7,625,043 | B2 * | 12/2009 | Hartenstine et al. ......... 297/250.1 |
| 7,845,726 | B2 * | 12/2010 | Mendenhall ................ 297/250.1 |
| 2006/0279117 | A1 * | 12/2006 | Munn et al. ................. 297/256.1 |

FOREIGN PATENT DOCUMENTS
EP 0301281 A2 2/1989
* cited by examiner

*Primary Examiner* — Sarah B McPartlin
(74) *Attorney, Agent, or Firm* — Pillsbury Winthrop Shaw Pittman, LLP

(57) ABSTRACT

A child car seat is adapted for use in an automobile, and includes a seat assembly and a backrest unit connected to the seat assembly and including a backrest body, a pair of safety belts, and a guide component. The backrest body has opposite front and rear surfaces, and a plurality of spaced apart pairs of belt slots. Each belt slot has opposite front and rear open ends formed respectively in the front and rear surfaces. Each safety belt has a free end portion. The guide component is coupled to the rear surface of the backrest body and covers the rear open ends of the belt slots. The free end portions of the safety belts are extended respectively through a selected one pair of the belt slots, and along a predetermined route behind the rear surface of the backrest body through guidance of the guide component.

20 Claims, 19 Drawing Sheets

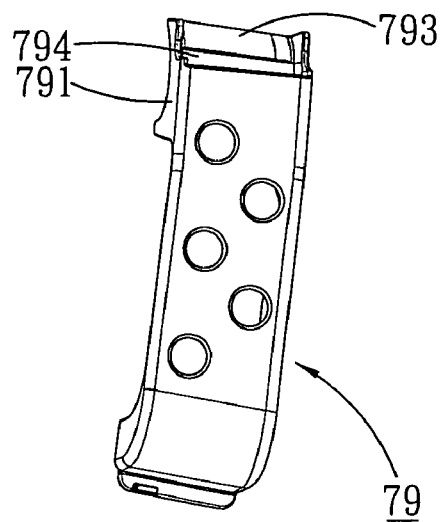
FIG. 5
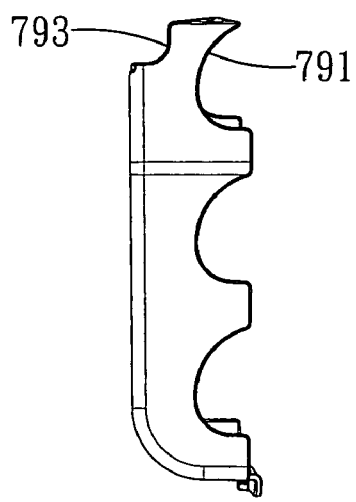 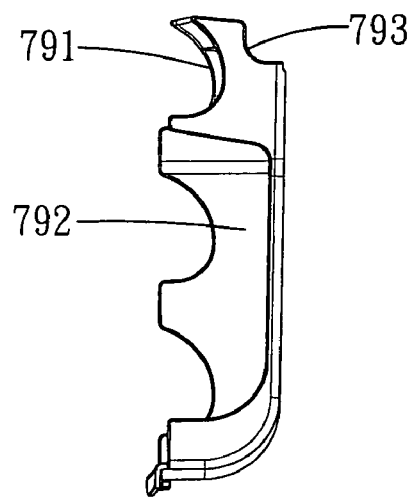
FIG. 6  FIG. 7

CHILD CAR SEAT

CROSS-REFERENCE TO RELATED APPLICATION

This application claims priority of U.S. Provisional Application No. 61/075,337, filed on Jun. 25, 2008.

BACKGROUND OF THE INVENTION

1. Field of the Invention

The invention relates to a child car seat, more particularly to a child car seat that can be utilized in different configurations for different sizes of children.

2. Description of the Related Art

There are many kinds of child car seats on the market that can be used in multiple configurations. U.S. Pat. No. 6,682,143 B2 discloses a conventional child car seat adapted to be used in an automobile. A larger-sized child can be secured on this conventional child car seat directly by the seat belt of the automobile. However, this conventional child car seat has a relatively large size.

U.S. Pat. No. 4,754,999 discloses another conventional child car seat that includes a base member and a seat assembly coupled on the base member and having a backrest. However, since the seat assembly is unitary and huge, this conventional child car seat also has a relatively large size.

A commercially available child car seat includes a base member, a seat assembly connected on the base member, and a recline mechanism operable for driving the seat assembly to recline relative to the base member so as to provide comfort for a child seated on the seat assembly. However, such recline mechanisms are generally difficult to operate.

U.S. Pat. No. 5,845,967 discloses still another conventional child car seat including a unitary shell having an upper backrest portion and a lower seat portion connected to each other by an integral hinge. The upper backrest portion can pivot relative to the lower seat portion to a position so that it is aligned with the lower seat portion to thereby facilitate storage and transport of this conventional child car seat. U.S. Pat. No. 5,845,968 discloses yet another conventional child car seat including a seat member and a backrest member. The backrest member can be stowed within the seat member, thereby also facilitating packing and shipping of this conventional child car seat.

Examples of recline mechanisms for child car seats can be found in: European Patent Application No. EP0301281, published on Feb. 1, 1989; U.S. Pat. No. 5,746,478, issued on May 5, 1998; U.S. Pat. No. 5,609,393, issued on Mar. 11, 1997; U.S. Pat. No. 5,181,761, issued on Jan. 26, 1993; U.S. Pat. No. 4,632,456, granted on Dec. 30, 1986; U.S. Pat. No. 6,554,358, granted on Apr. 29, 2003; and U.S. Pat. No. 6,428,099, issued on Aug. 6, 2002.

U.S. Pat. No. 6,623,074 discloses still another conventional child car seat provided with a vertically movable headrest on which the harness straps are mounted so that the position of the harness straps will be automatically changed when the headrest is moved.

It is desirable that a child car seat has some of the advantages of the above-mentioned conventional child car seats.

SUMMARY OF THE INVENTION

Therefore, the object of the present invention is to provide a child car seat having multiple configurations for children of different sizes, and a pair of safety belts that can be repositioned to accommodate the children of different sizes and that are easy to operate.

Accordingly, a child car seat of the present invention is adapted for use in an automobile to transport a child. The automobile includes a seat belt for securing the child car seat in the automobile. The child car seat comprises a seat assembly adapted for supporting the child thereon, and a backrest unit connected to the seat assembly and including a backrest body, a pair of safety belts, and a guide component. The backrest body has opposite front and rear surfaces, and a plurality of spaced apart pairs of belt slots. Each of the belt slots has opposite front and rear open ends formed respectively in the front and rear surfaces. Each of the safety belts has a free end portion. The guide component is coupled to the rear surface of the backrest body, and covers the rear open ends of the belt slots. The free end portions of the safety belts are extended respectively through a selected one pair of the belt slots, and along a predetermined route behind the rear surface of the backrest body through guidance of the guide component.

BRIEF DESCRIPTION OF THE DRAWINGS

Other features and advantages of the present invention will become apparent in the following detailed description of the preferred embodiment with reference to the accompanying drawings, of which:

FIG. 5 is a perspective view of a guide component of the preferred embodiment;

FIG. 6 is a side view of the guide component;

FIG. 7 is another side view of the guide component;

DETAILED DESCRIPTION OF THE PREFERRED EMBODIMENT

Figure 1:
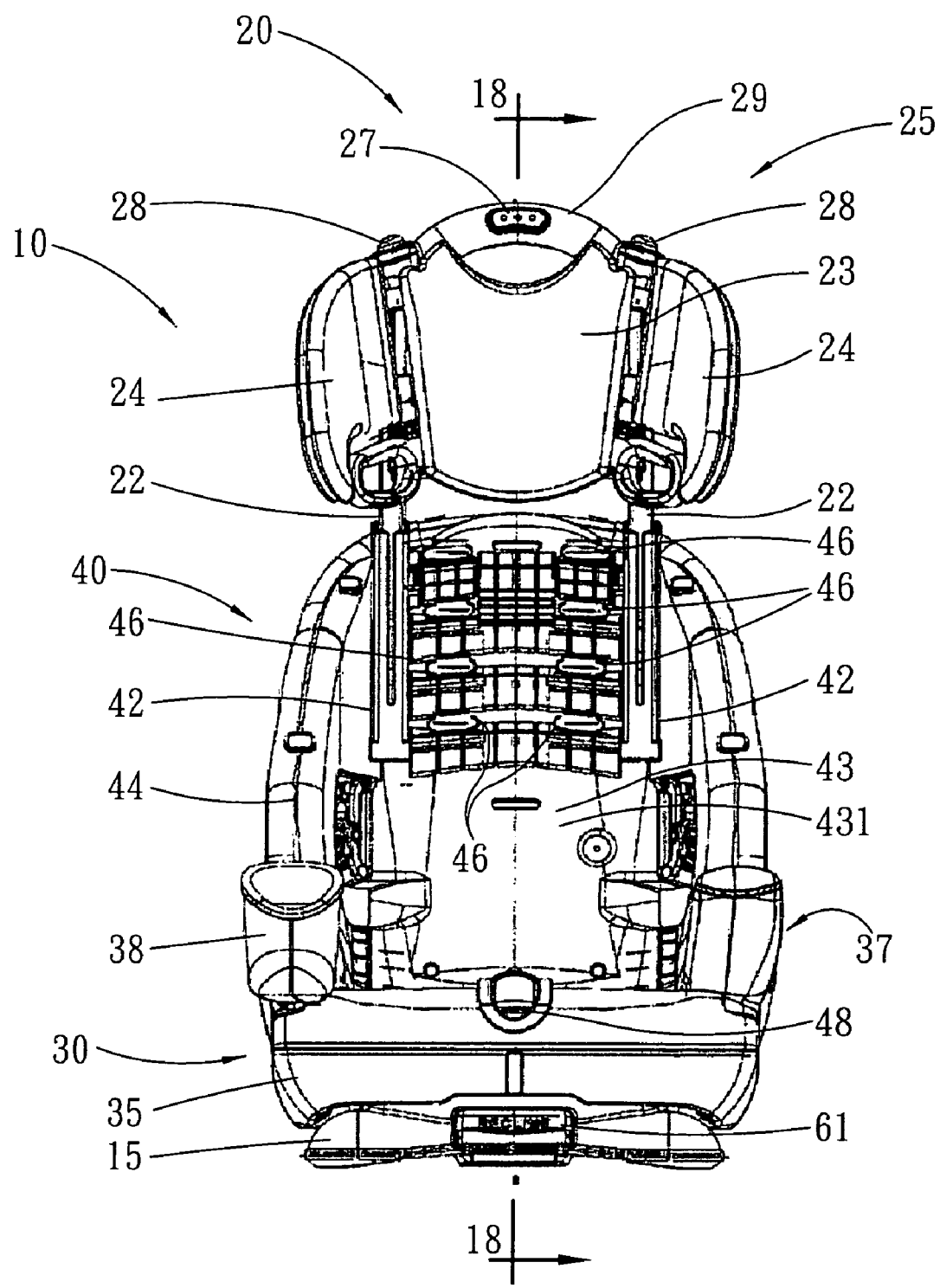
FIG. 1 is a fragmentary schematic front view of a preferred embodiment of a child car seat according to the invention, illustrating a headrest unit at a higher position.

As shown in FIGS. 1 to 3, 11, 12 and 18, the preferred embodiment of a child car seat 10 according to the present invention is adapted for use in an automobile (not shown) to transport a child (not shown). The child car seat 10 comprises a seat assembly 30 adapted for supporting the child thereon, a backrest unit 40, a headrest unit 20, a pair of backrest locking mechanisms 50, a pivot locking mechanism 55 (see FIG. 12), and a recline adjustment mechanism 60.

The backrest unit 40 is connected removably to the seat assembly 30, and includes a backrest body 43, a pair of side wings 44, a pair of guide components 79, a hanger 47, and a safety belt unit 490.

The backrest body 43 is upright when coupled to the seat assembly 30, and has opposite front and rear surfaces 431, 432, and a plurality of pairs of belt slots 46 spaced apart from each other in a longitudinal direction. Each of the belt slots 46 has opposite front and rear open ends formed respectively in the front and rear surfaces 431, 432. The backrest body 43 further has a pair of channels 42 formed in the front surface 431, extending in the longitudinal direction, and spaced apart from each other in a direction transverse to the longitudinal direction such that the belt slots 46 are disposed between the channels 42. The side wings 44 extend integrally and respectively from opposite lateral sides of the backrest body 43. The backrest body 43 further has a pair of mounting pins 51 that project respectively from opposite lateral sides of the backrest body 43, and that are adjacent to a bottom end of the backrest body 43.

Figure 3:
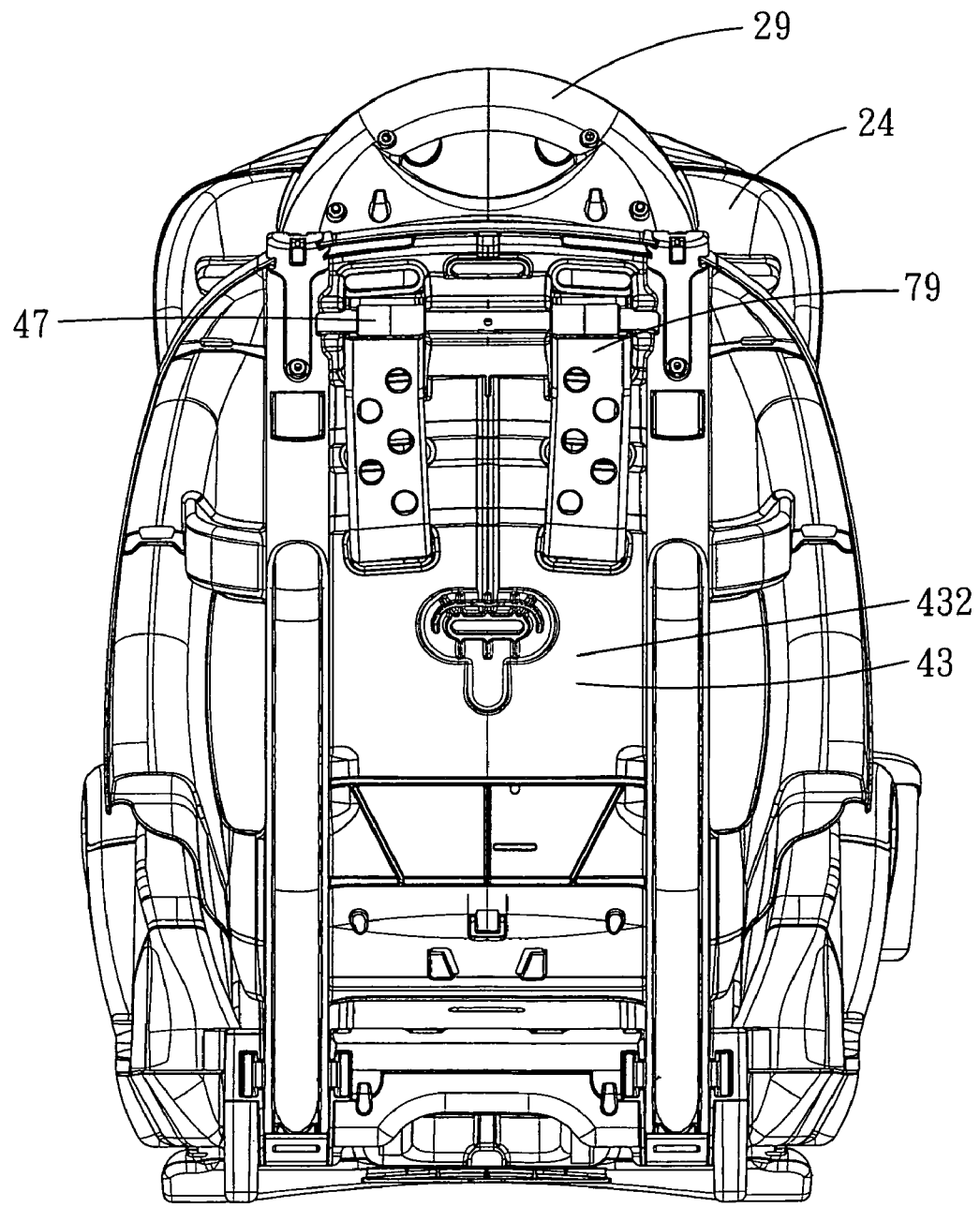
FIG. 3 is a rear view of the preferred embodiment.
Figure 4:
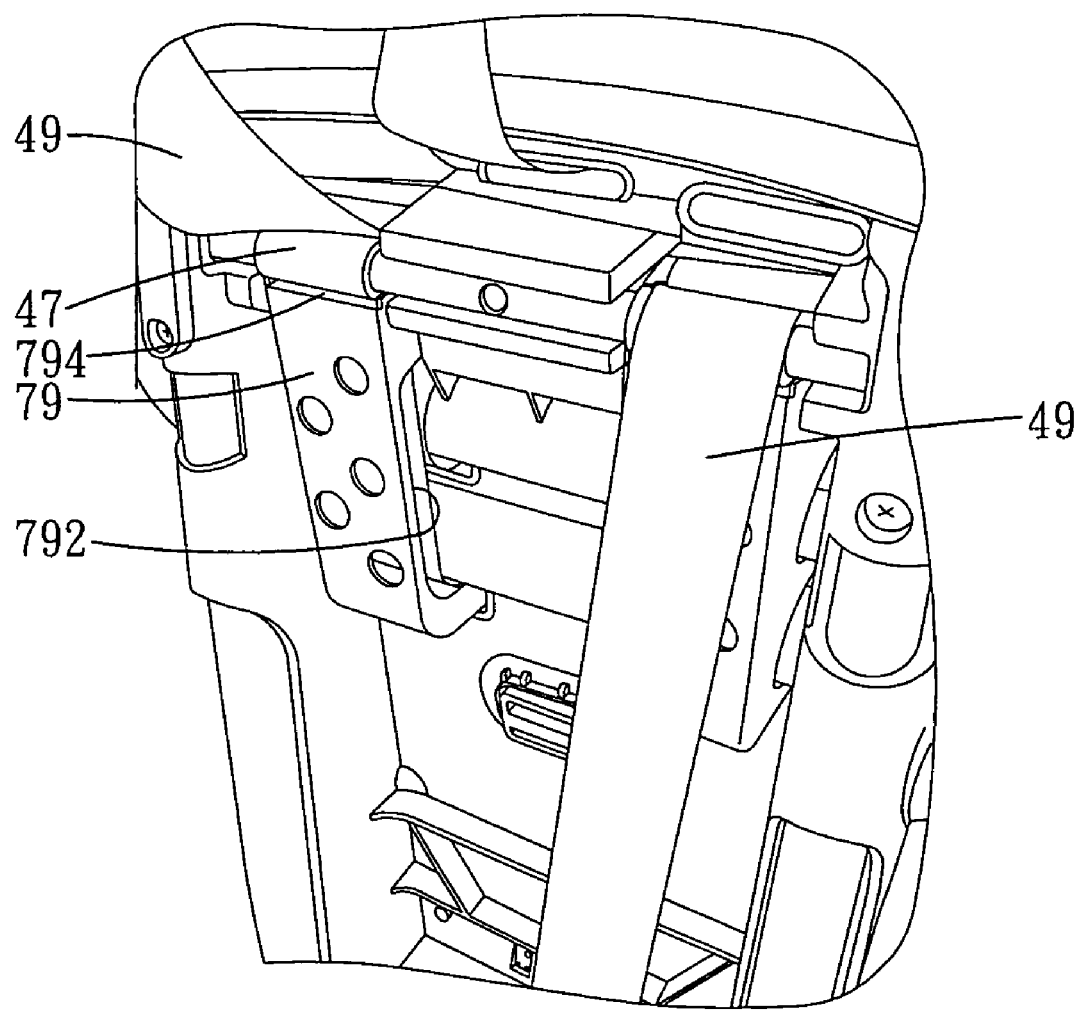
FIG. 4 is a fragmentary rear perspective view of the preferred embodiment.

Referring to FIGS. 3 and 4, the guide components 79 are coupled to the rear surface 432 of the backrest body 43, are spaced apart from each other in the direction transverse to the longitudinal direction, and cooperatively cover the rear open ends of the belt slots 46. The hanger 47 is coupled to the rear surface 432 of the backrest body 43 at a position above the guide components 79. Referring further to FIGS. 5 to 7, each of the guide components 79 has an opening 792 formed in an inner side wall thereof, a first concaved portion 791 formed at an upper end of a front side thereof so as to fit the configuration of the backrest body 43, a second concaved portion 793 formed at an upper end of a rear side thereof and abutting against the hanger 47.

Figure 18:
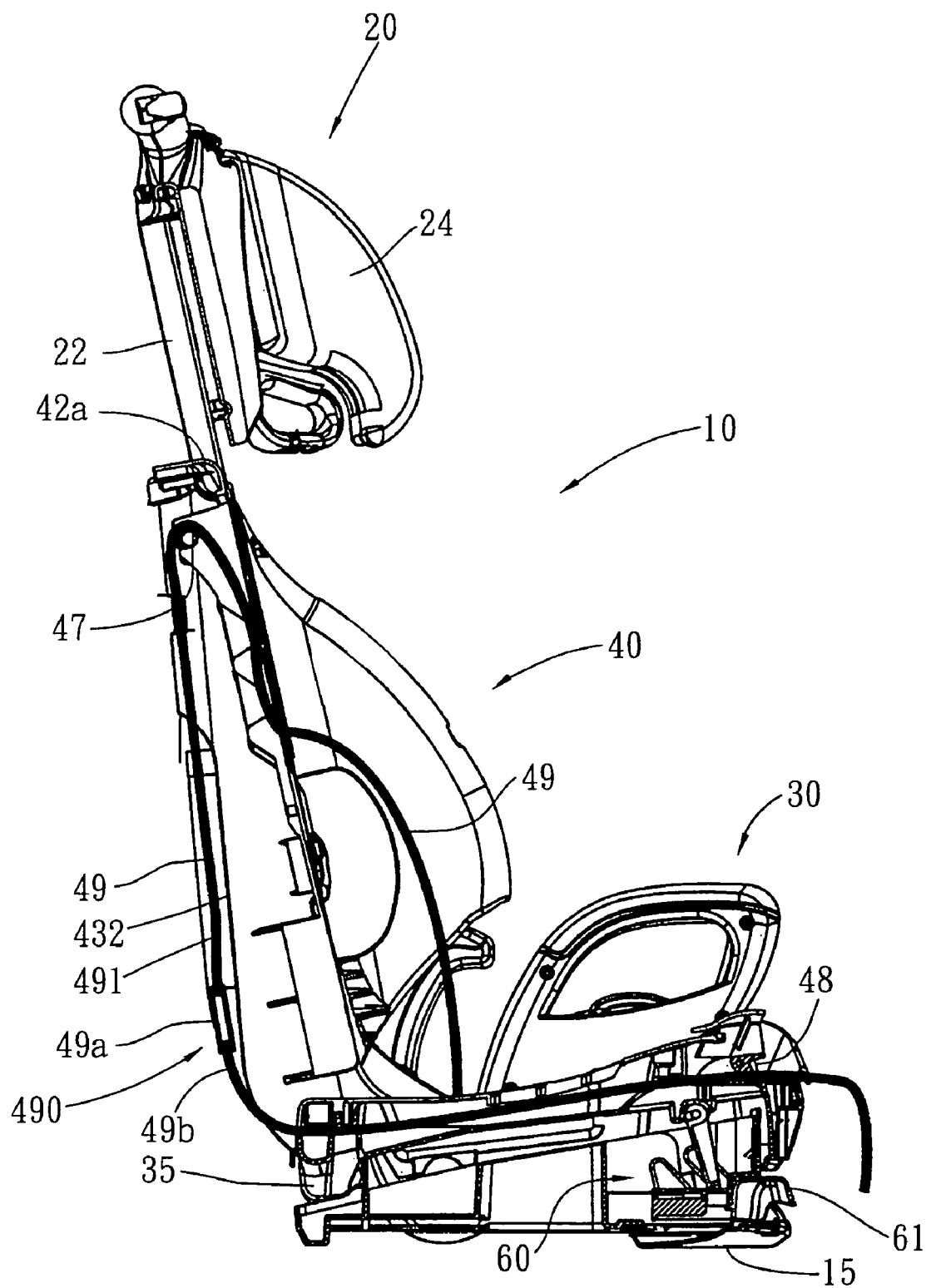
FIG. 18 is a schematic sectional view of the preferred embodiment taken along line 18-18 in FIG. 1.
Figure 19:
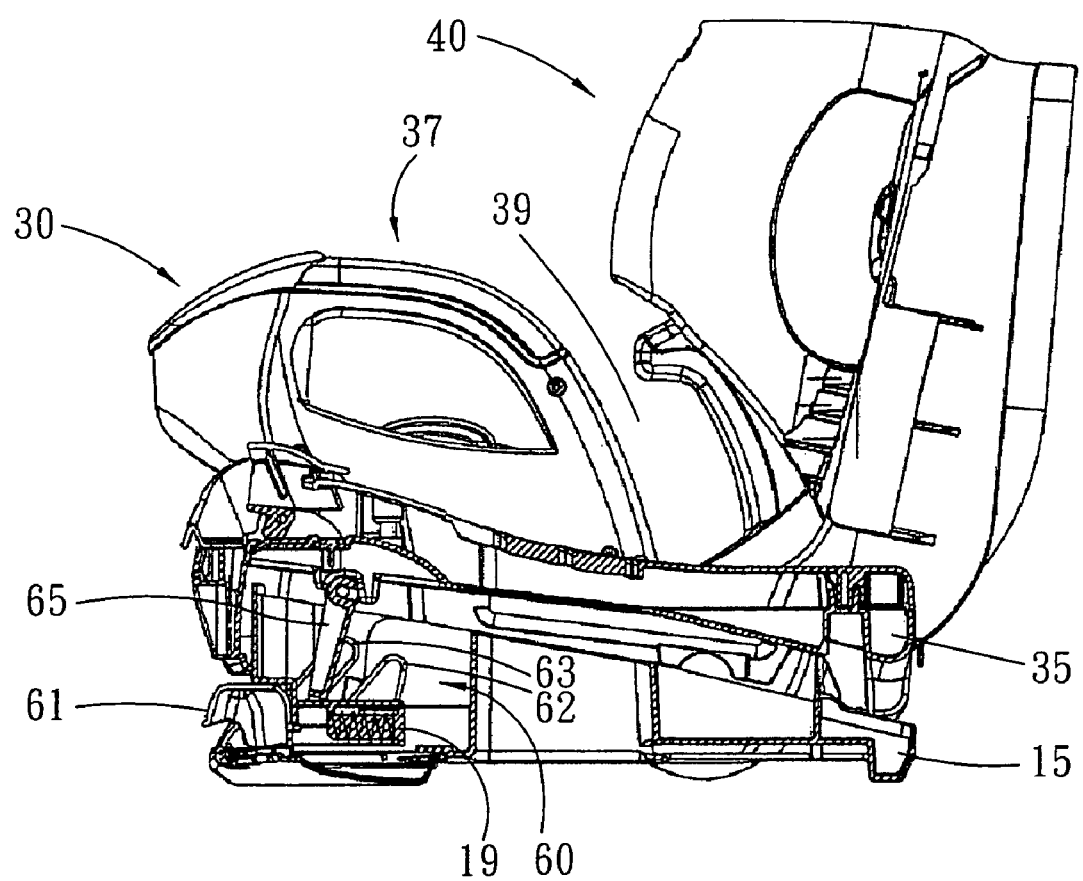
FIG. 19 is a fragmentary partly sectional view of the preferred embodiment, illustrating the seat assembly at a zero-degree recline angle orientation, and an actuator handle at an engaging position.
Figure 20:
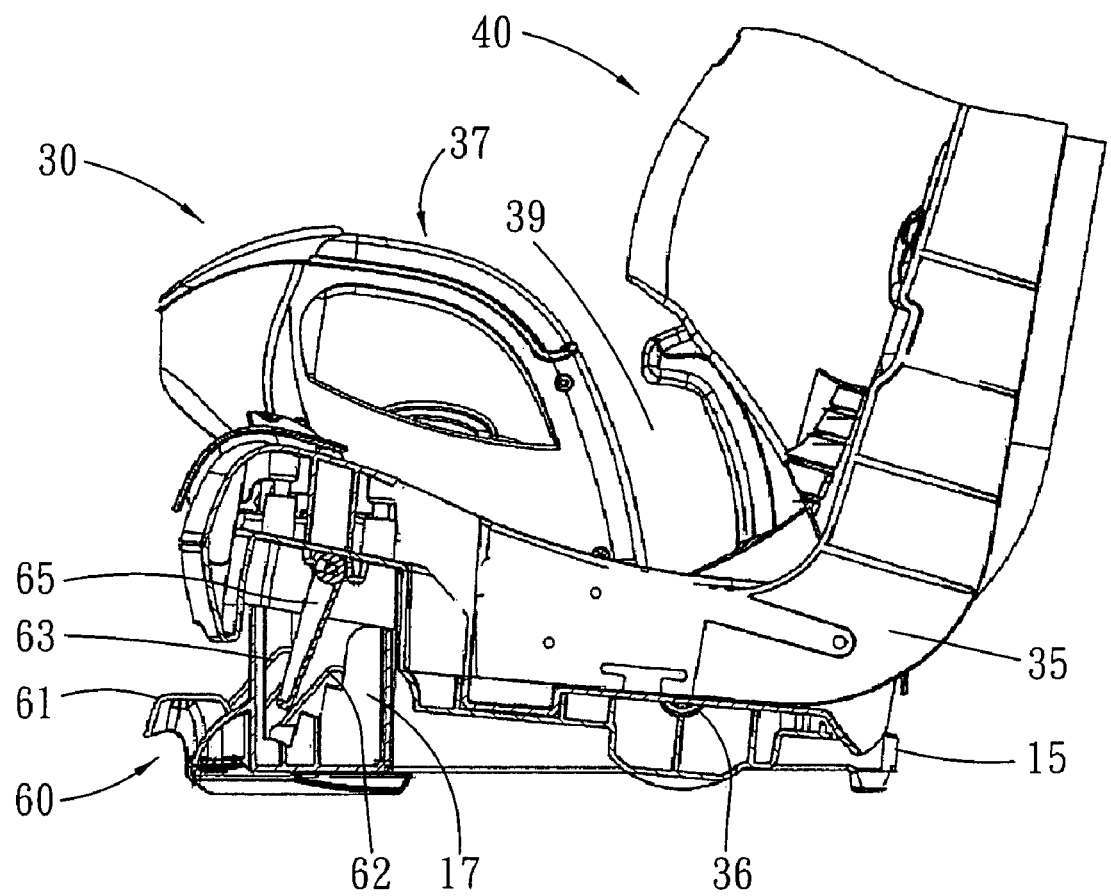
FIG. 20 is a view similar to FIG. 19, but illustrating the actuator handle at a releasing position.
Figure 21:
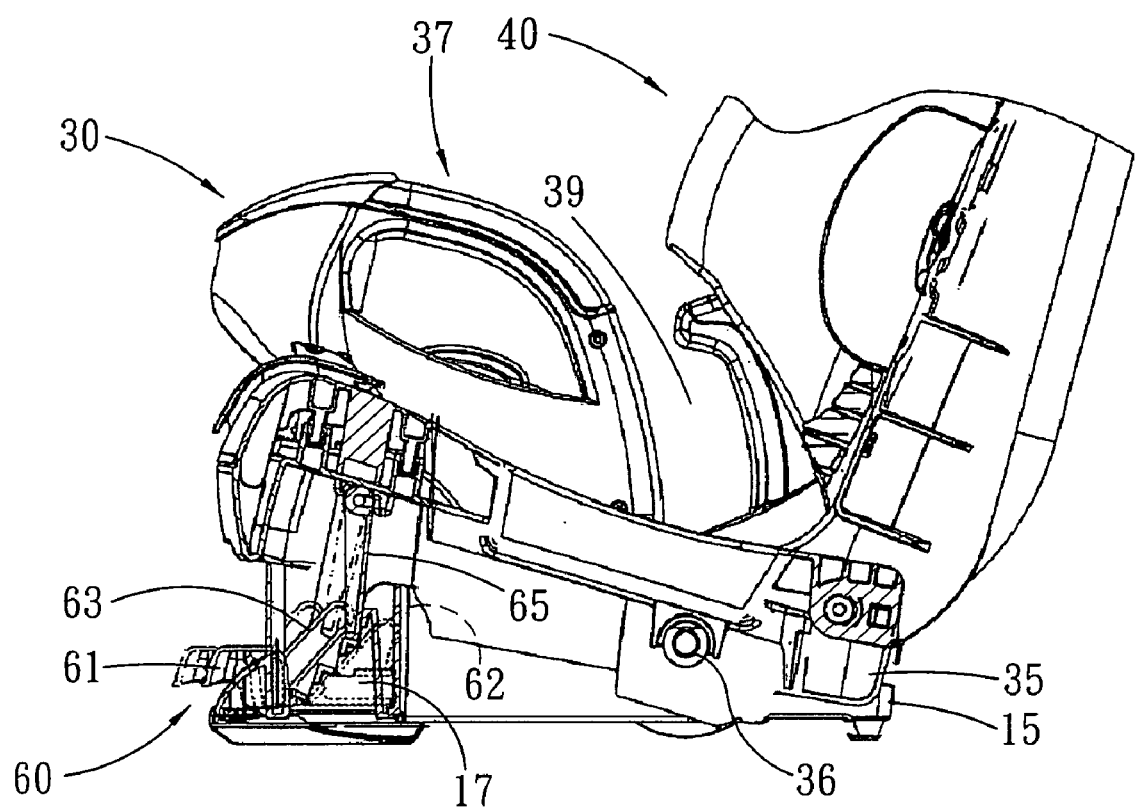
FIG. 21 is another view similar to FIG. 19, but illustrating the seat assembly at a ten-degree recline angle orientation, the movement of the actuation handle and the paddle member being shown in phantom.
Figure 22:
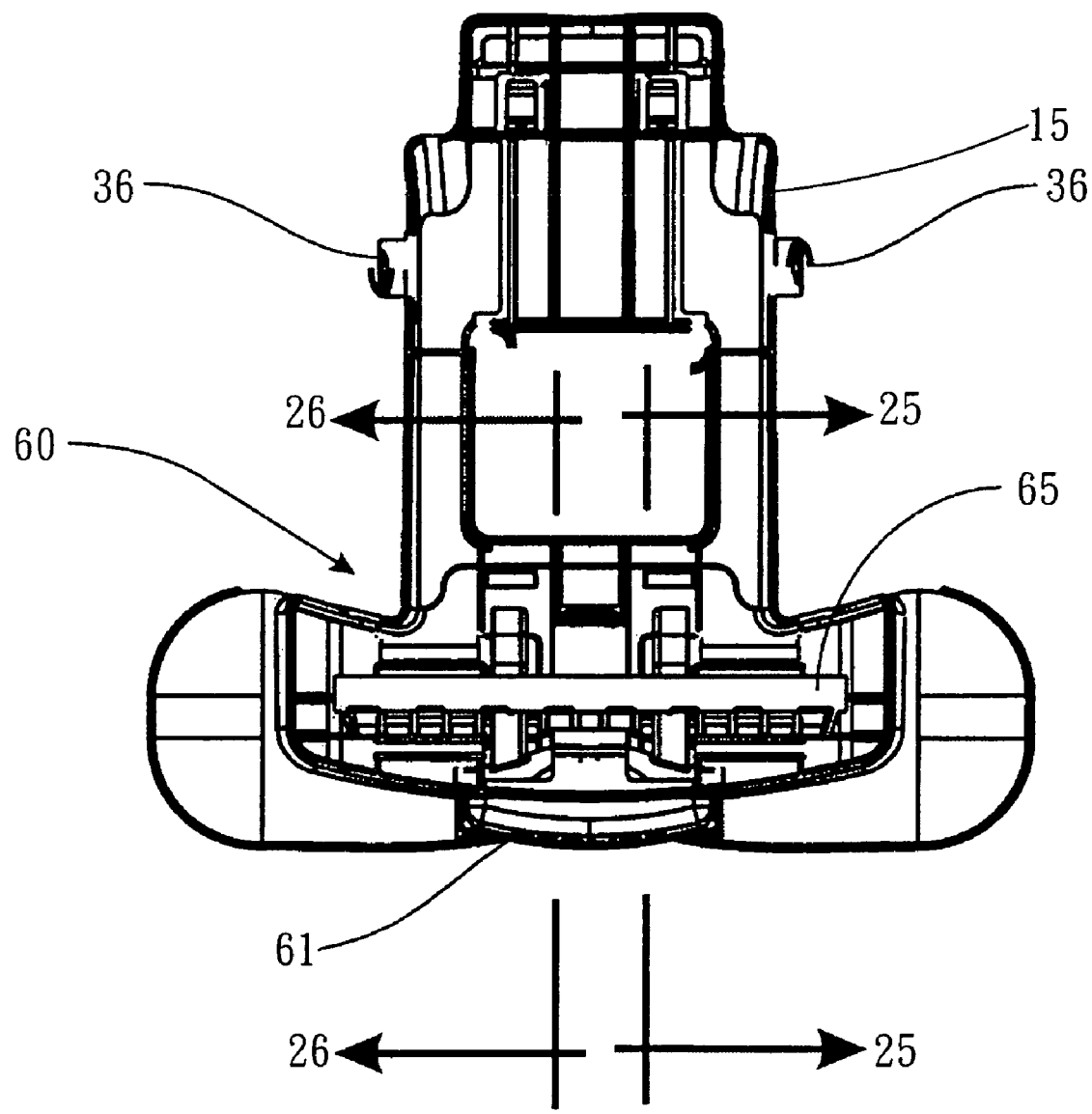
FIG. 22 is a top view of the recline adjustment mechanism and a base member of the preferred embodiment.
Figure 23:
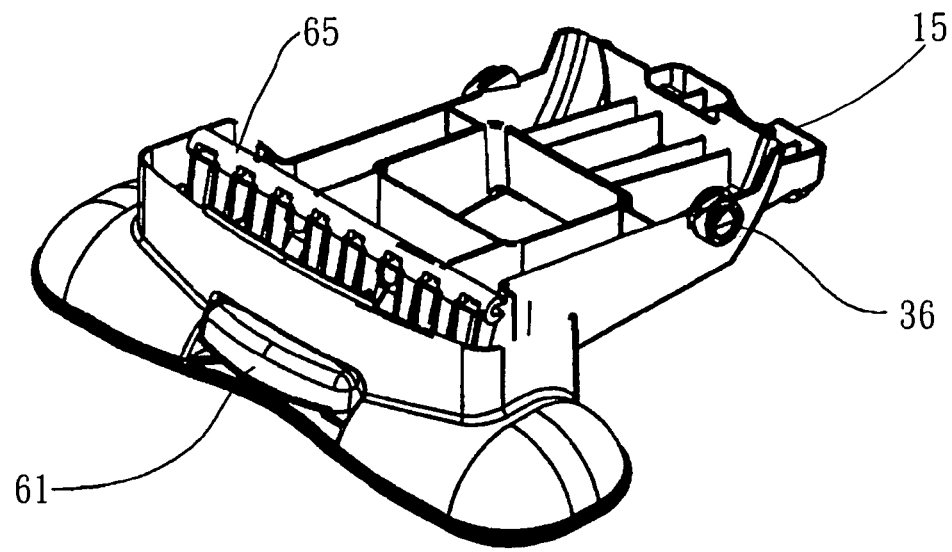
FIG. 23 is a perspective view of the base member of the preferred embodiment.
Figure 24:
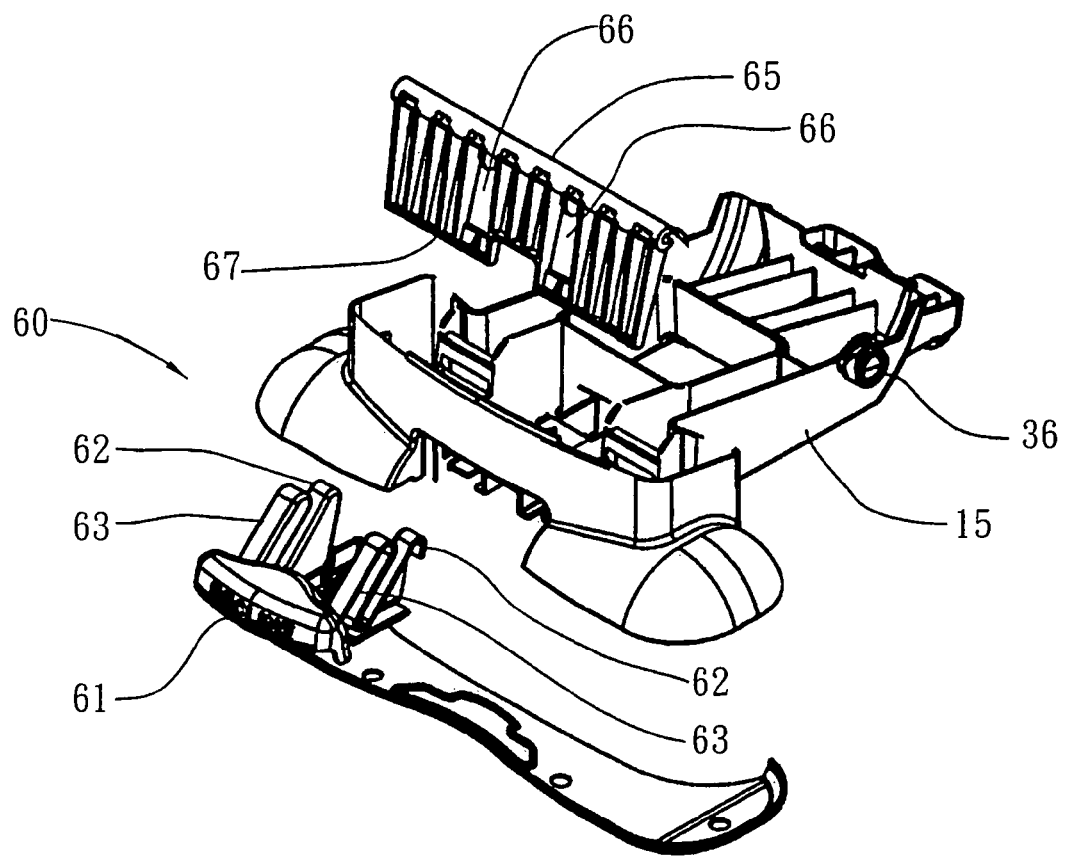
FIG. 24 is an exploded perspective view of the recline adjustment mechanism and the base member of the preferred embodiment.
Figure 25:
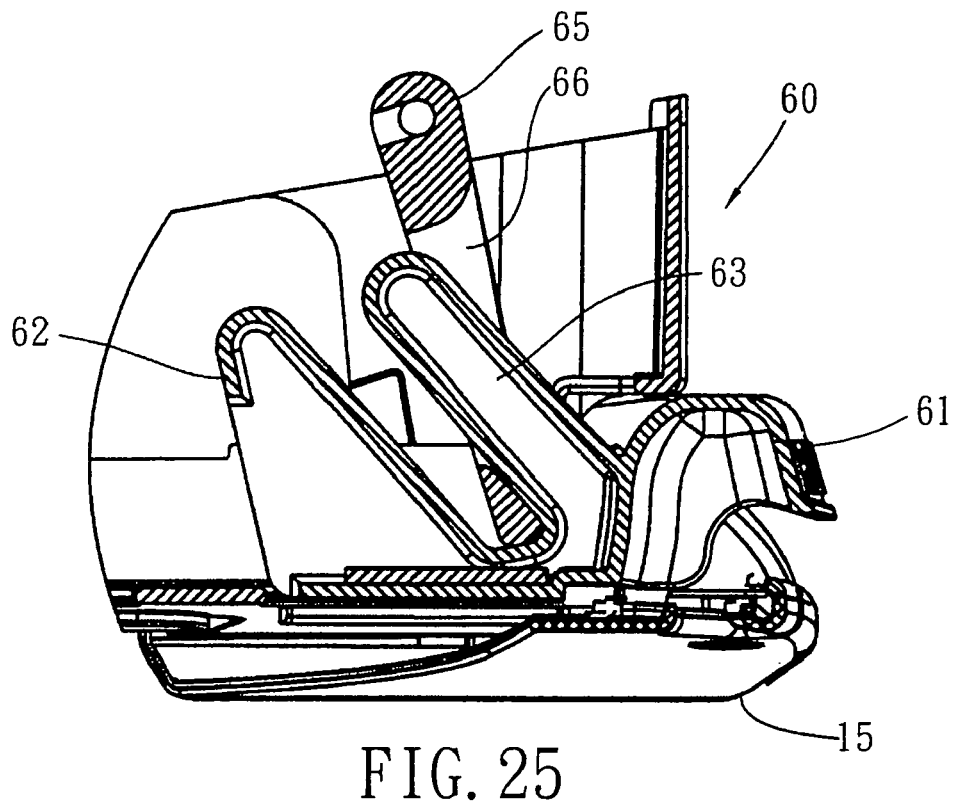
FIG. 25 is a fragmentary sectional view of the recline adjustment mechanism and the base member taken along line 25-25 in FIG. 22 when the seat assembly is at the zero-degree recline angle orientation.
Figure 26:
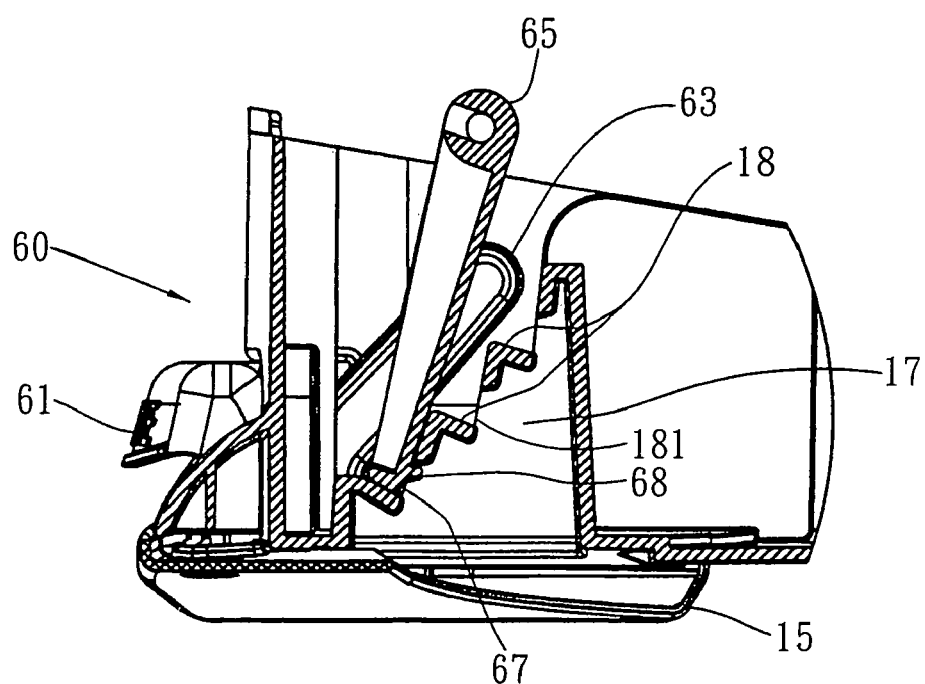
FIG. 26 is another fragmentary sectional view of the recline adjustment mechanism and the base member taken along line 26-26 in FIG. 22 when the seat assembly is at a five-degree recline angle orientation.
Figure 27:
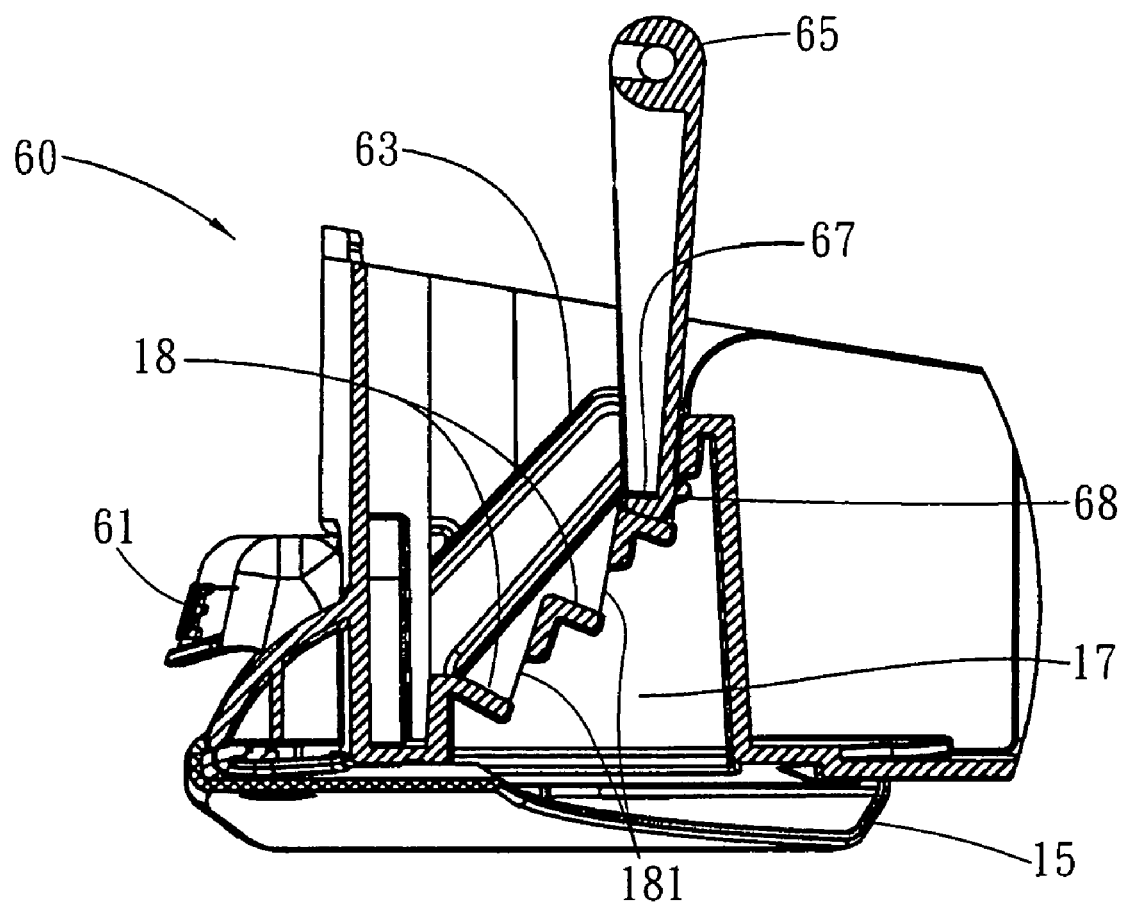
FIG. 27 is a view similar to FIG. 26, but illustrating the recline adjustment mechanism when the seat assembly is at the ten-degree recline angle orientation.

As further shown in FIG. 18, the safety belt unit 490 includes a pair of safety belts 49, a connection plate 49a, and a connecting belt 49b. Each of the safety belts 49 has a free end portion 491. The connection plate 49a is disposed behind the rear surface 432 of the backrest body 43. The connecting belt 49b has an end that is connected to the connection plate 49a, and an opposite end that is extended through the seat assembly 30 and that is connected to a belt tightening device 48 mounted at a front end of the seat assembly 30.

In use, when the child is seated on the seat assembly 30, the free end portions 491 of the safety belts 49 can be extended respectively and rearwardly through a selected one pair of the belt slots 46 in order to hold the child's shoulder on the backrest body 43. Afterward, the free end portion 491 of each of the safety belts 49 is further extended upwardly between the rear surface 432 of the backrest body 43 and a respective one of the guide components 79 toward the hanger 47. Finally, each of the safety belts 49 is extended around the hanger 47, and downwardly from the hanger 47 onto the connection plate 49a, thereby securing the child on the child car seat 10 of this invention. It is noted that the belt adjustment is not required every time the child is seated on the car seat. Further belt adjustment is required only when the size of the child seated on the car seat 10 is different.

Since the guide components 79 cover the rear open ends of the belt slots 46, the free end portions 491 of the safety belts 49 are not allowed to be extended directly and downwardly from any pair of the belt slots 46 onto the connection plate 49a. Instead, the free end portions 491 of the safety belts 49 can only be extended upwardly behind the rear surface 432 of the backrest body 43, around the hanger 47, and downwardly onto the connection plate 49a. Therefore, the connection plate 49a will be kept intact no matter which pair of the belt slots 46 the free end portions 491 of the safety belts 49 may be extended respectively through, thereby effectively reducing friction between the connection plate 49a and the rear surface 432 of the backrest body 43. It should be noted that the openings 792 of the guide components 79 allow access of the fingers of a user to the free end portions 491 of the safety belts 49, thereby facilitating routing of the free end portions 491 of the safety belts 49. Moreover, in other embodiments of this invention, each of the guide components 79 may further have a slot 794 (see FIG. 5) formed at the second concaved portion 793. Therefore, after the free end portions 491 of the safety belts 49 are extended through the backrest body 43, they may also be extended respectively through the slots 794 of the guide components 79, around the hanger 47 and downwardly from the slots 794 of the guide components 79 onto the connection plate 49a. Furthermore, correct extension of safety belts 49 along a predetermined route is very important. If the safety belts 49 are properly extended around the hanger 47 and firmly fastened to the car seat 10, the hanger 47 can absorb shock when the automobile is subjected to impact, such as in the event of a collision, thereby preventing severe injury to the child seated on the car seat 10. Since the disposition of the guide components 79 helps the user to extend the safety belts 49 correctly, it also enhances safety of the car seat 10 during use.

Figure 14:
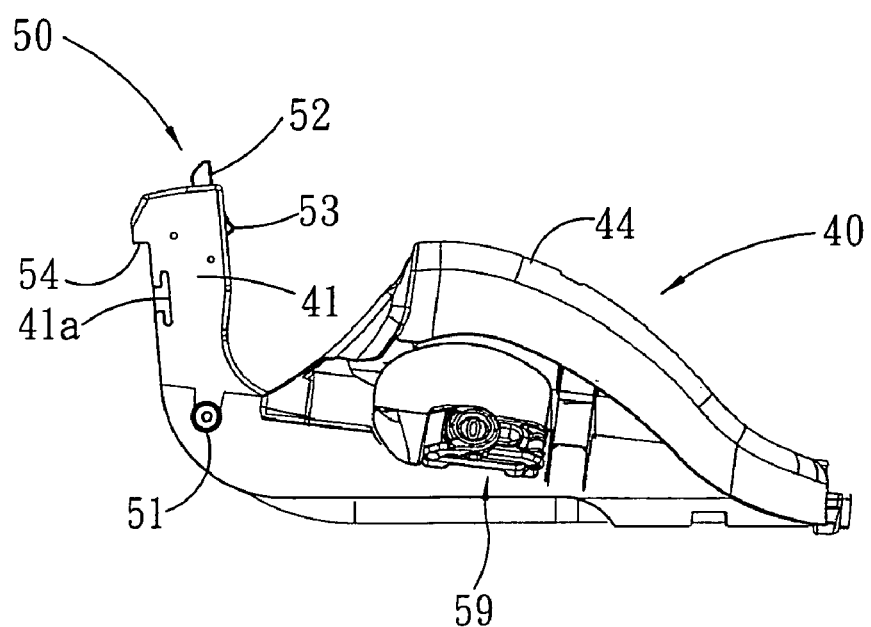
FIG. 14 is a schematic side view of the backrest unit.

Referring back to FIGS. 1 and 2, and further referring to FIG. 14, the backrest unit 40 further includes a pair of spaced-apart attachment arms 41 extending forwardly from the bottom end of the backrest body 43 and coupled removably to the seat assembly 30. Each of the attachment arms 41 has a distal end portion formed with an offset step 54.

Figure 15:
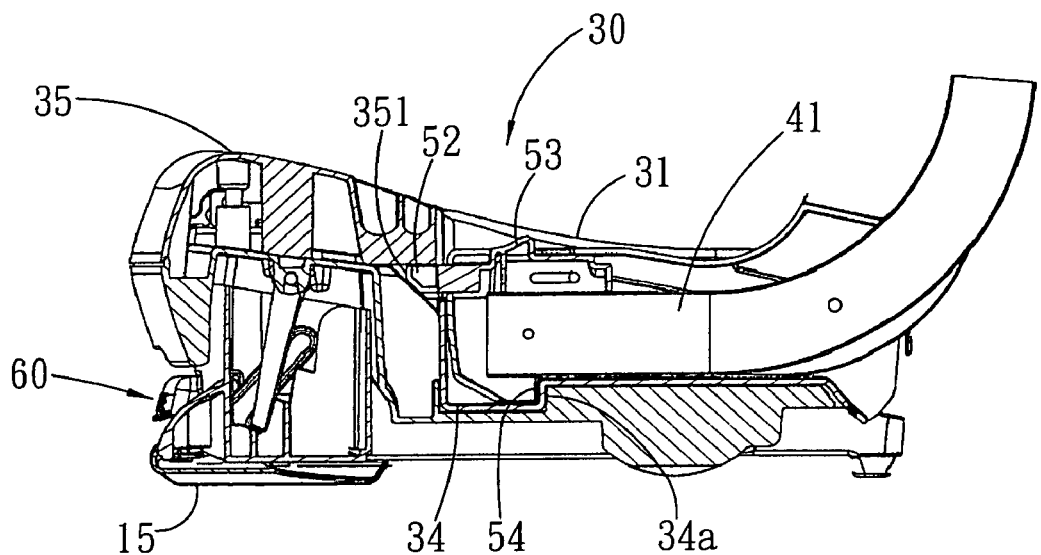
FIG. 15 is a fragmentary schematic sectional view of the preferred embodiment.
Figure 16:
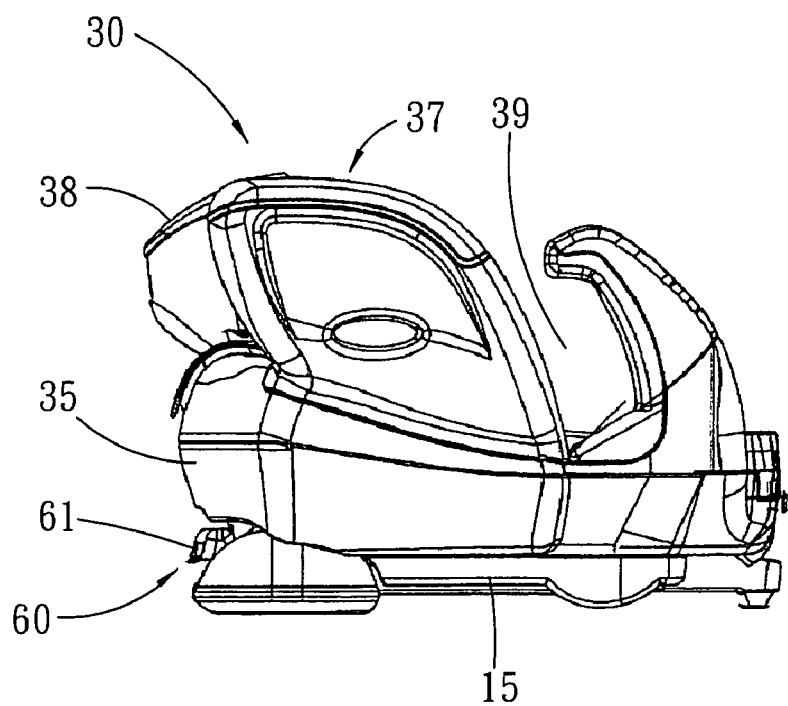
FIG. 16 is a schematic side view of the seat assembly.

As shown in FIGS. 1, 16 and 20 to 23, the seat assembly 30 has a base member 15 that is provided with a pivot shaft 36, and a seat member 35 that is connected to the base member 15, that is pivotable on the pivot shaft 36 relative to the base member 15, and that is formed with a substantially horizontally extending supporting surface 31 (see FIG. 15) adapted for sitting of the child thereon, and a pair of spaced-apart receptacles 34, each of which has a depression 34a (see FIG. 15). The seat assembly 30 further has a pair of pin holes 33 (only one is visible in FIG. 12) for engaging respectively and removably the mounting pins 51 of the backrest unit 40.

Figure 12:
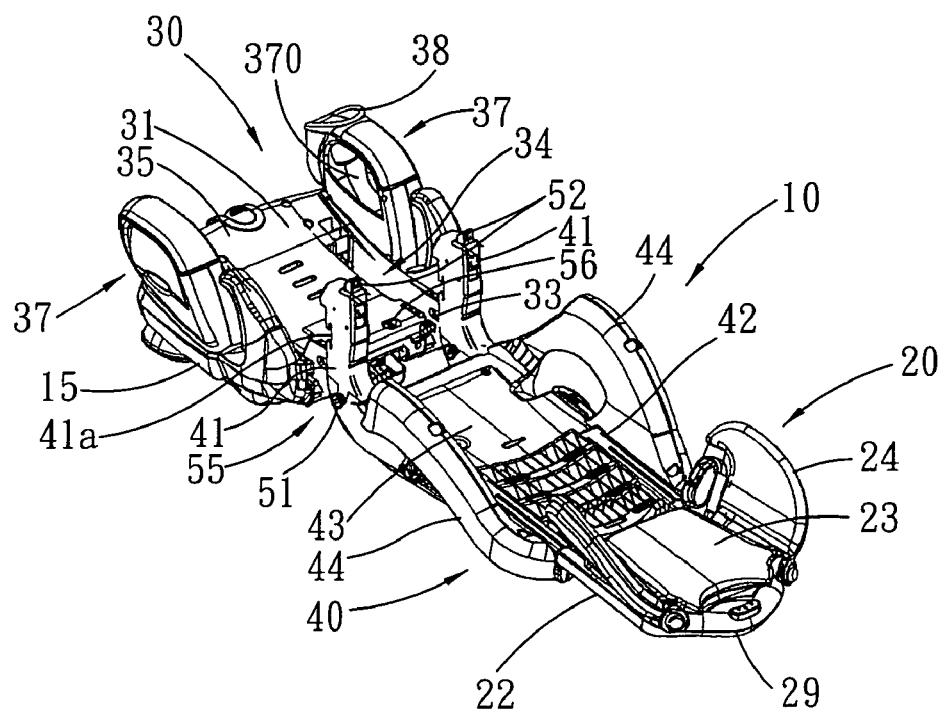
FIG. 12 is a perspective view of the preferred embodiment, illustrating the backrest unit being separated from a seat assembly.
Figure 13:
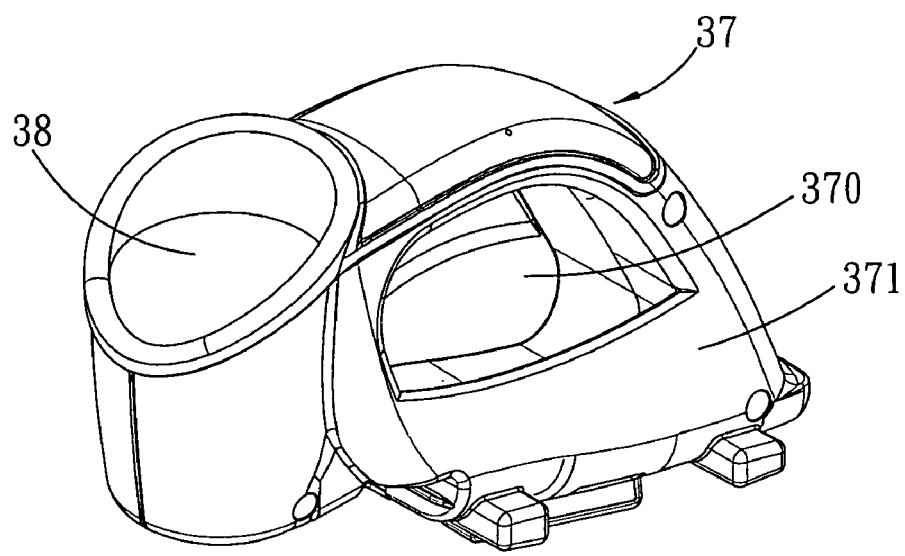
FIG. 13 is a perspective view of an armrest of the preferred embodiment.

Further referring to FIG. 12, the pivot locking mechanism 55 is provided in the rearward portion of the seat assembly 30, and includes a spring-loaded switch 56 operable for retaining respectively the mounting pins 51 of the backrest unit 40 within the pin holes 33 in the seat assembly 30 so as to connect the backrest unit 40 to the seat assembly 30. As such, the backrest unit 40 is pivotable about the mounting pins 51 relative to the seat assembly 30 between an operative position (see FIGS. 1, 2 and 8), where the backrest unit 30 is upright, and where the attachment arms 41 are retained respectively in the receptacles 34, and a shipping position (see FIG. 11), where the backrest unit 40 is aligned with the seat assembly 30. Referring to FIG. 15, when the backrest unit 40 is at the operative position, the offset steps 54 of the attachment arms 41 engage respectively the depressions 34a in the receptacles 34 to prevent rearward movement of the attachment arms 41 from the seat assembly 30. The spring-loaded switch 56 is also operable for removing respectively the mounting pins 51 from the pin holes 33, such that the backrest unit 40 can be separated from the seat assembly 30.

As shown in FIGS. 11, 12, 14 and 15, the backrest locking mechanisms 50 are disposed respectively at the attachment arms 41 of the backrest unit 40. Each of the backrest locking mechanisms 50 includes a spring-loaded latch 52 and an actuator 53. When the backrest unit 40 pivots relative to the seat assembly 30 to the operative position, the latches 52 are pushed by the seat member 35 to retract to allow the attachment arms 41 to be properly and respectively retained within the receptacles 34, and are then released to engage respectively the recesses 351 (only one is visible in FIG. 15) of the seat assembly 30 to thereby lock the backrest unit 40 at the operative position. The actuator 53 is operable for retracting the latches 52 against spring forces exerted on the latches 52 so as to permit separation of the attachment arms 41 from the receptacles 34. Each of the attachment arms 41 of the backrest unit 40 further has a retaining slot 41a (see FIG. 14) for retaining the safety belts 49 so as to trap the safety belts 49 in the assembled child car seat package.

As shown in FIGS. 1, 2, 13 and 15, the seat assembly 30 further includes a pair of armrests 37 formed respectively at opposite lateral sides of the supporting surface 31 of the seat member 35. In this embodiment, one of the armrests 37 is formed with a cup holder 38, and has an inner side surface 371 confronting the other one of the armrests 37 and formed with a storing space 370 therein.

Figure 8:
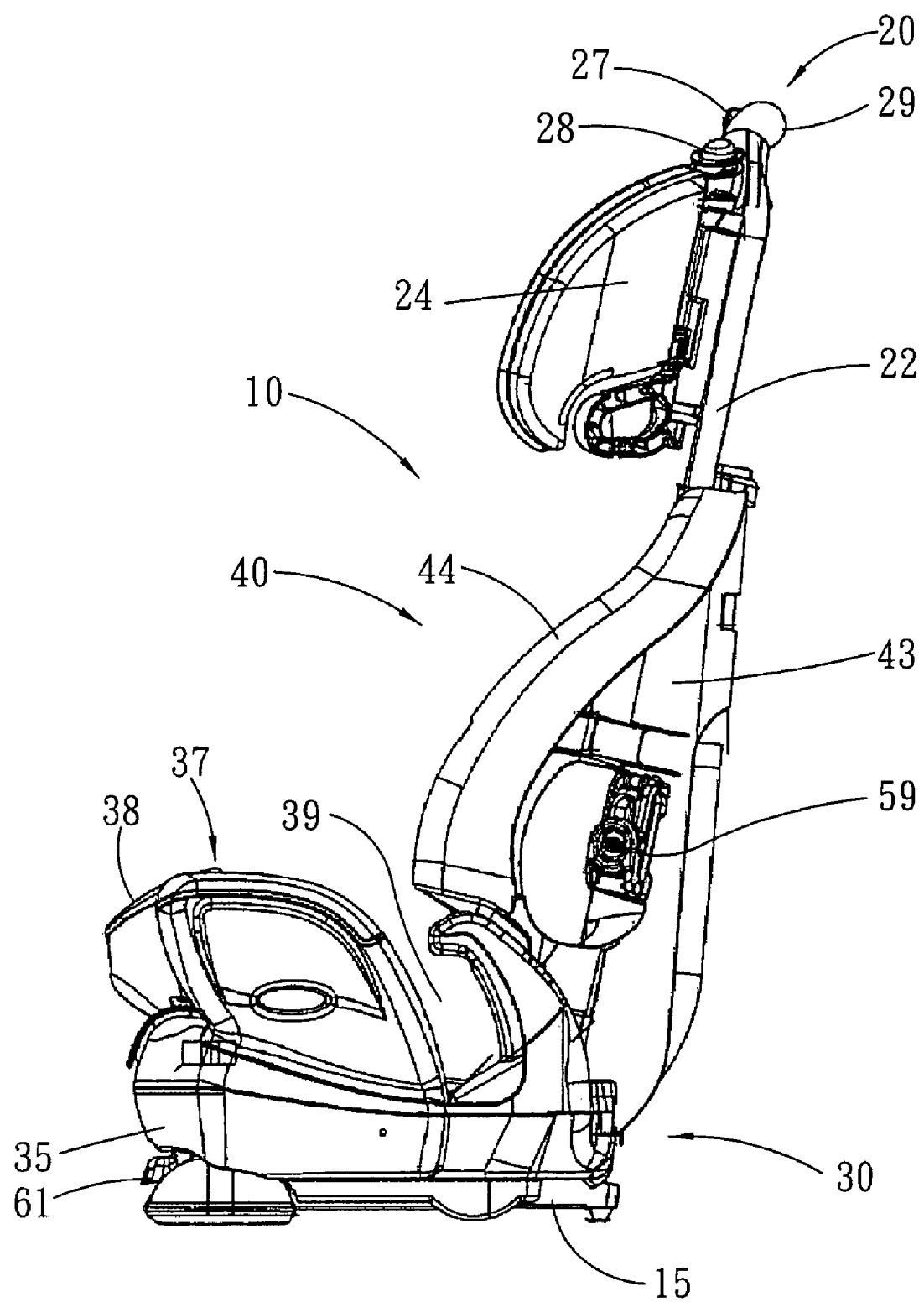
FIG. 8 is a schematic side view of the preferred embodiment, illustrating a backrest unit being upright.
Figure 9:
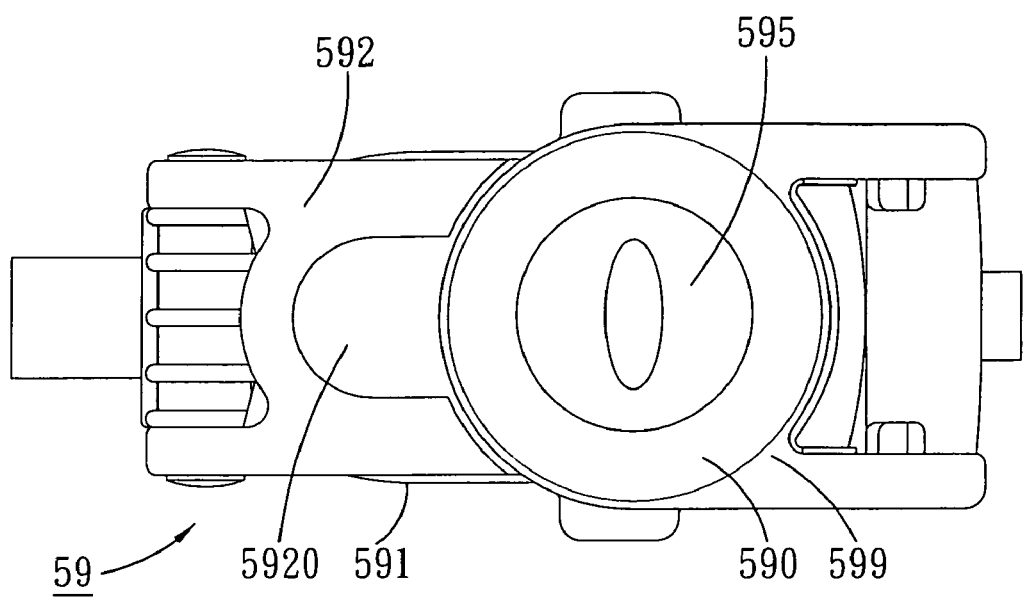
FIG. 9 is a schematic view of a belt clamp when a clamping component is at a clamping position.
Figure 10:
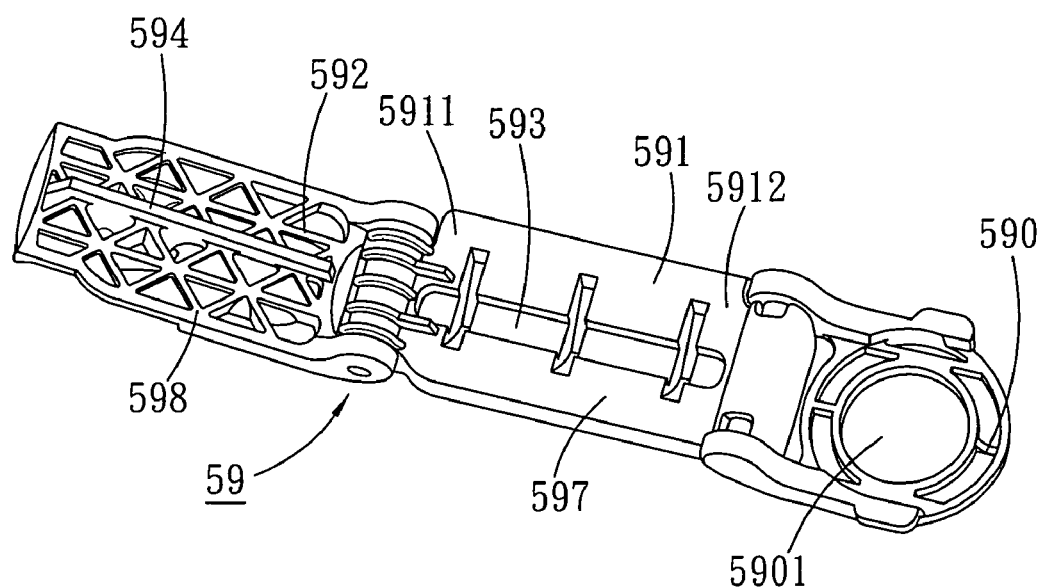
FIG. 10 is a perspective view of the belt clamp when the clamping component is at an open position.
Figure 11:
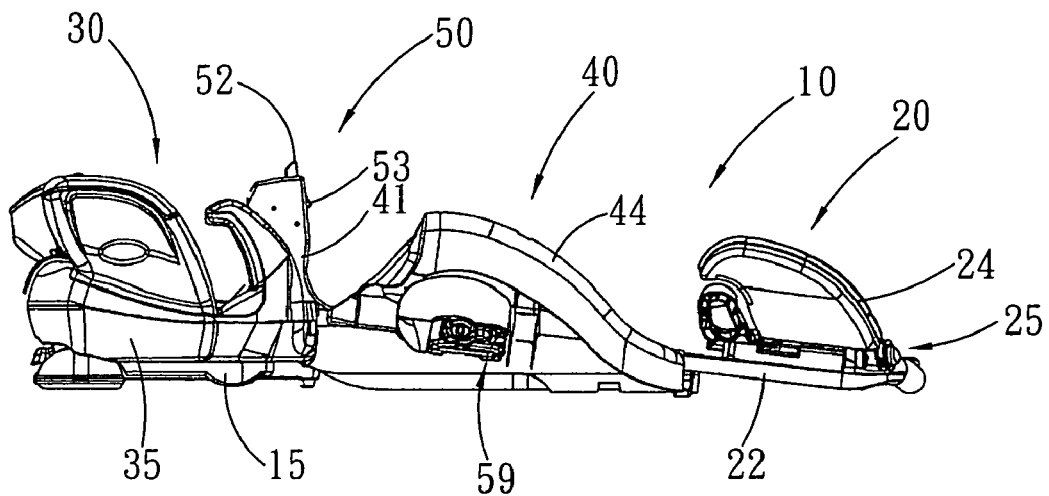
FIG. 11 is another schematic side view of the preferred embodiment, illustrating the backrest unit at a shipping position.

The child car seat 10 of this invention is secured to an automobile seat (not shown) by a seat belt (not shown) of the automobile. The seat belt includes a shoulder belt (not shown) and a lap belt (not shown) As shown in FIGS. 8 to 10, the backrest unit 30 further includes a pair of belt clamps 59 (only one is visible) that are mounted respectively to opposite lateral sides of the backrest body 43, and that are disposed respectively behind the side wings 44. Each of the belt clamps 59 includes a first clamp component 591, a second clamp component 592, and a securing cap 590. The first clamp component 591 of each of the belt clamps 59 includes a first clamp component 591 that has opposite first and second ends 5911, 5912, and a first clamping surface 597 disposed between the first and second ends 5911, 5912 and formed with a groove 593. The second clamp component 592 of each of the belt clamps 59 is connected pivotally to the first end 5911 of the first clamp component 591, and has a second clamping surface 598 formed with an engaging block 594. The second clamp component 592 is pivotable relative to the first clamp component 591 between a clamping position (see FIG. 9), where the second clamping surface 598 cooperates with the first clamping surface 597 to clamp the shoulder belt of the seat belt of the automobile, and an open position (see FIG. 10), where the shoulder belt of the seat belt of the automobile is released from the first and second clamp components 591, 592. When the second clamp component 592 is at the clamping position, the engaging block 594 of the second clamp component 592 engages the groove 593 in the first clamp component 591 so as to clamp securely the shoulder belt therebetween. The securing cap 590 of each of the belt clamps 59 is connected pivotally to the second end 5912 of the first clamp component 591, and has a first engaging portion 5901. The second clamp component 592 of each of the belt clamps 59 further has a back surface 599 opposite to the second clamping surface 598 and formed with a second engaging portion 595. In this embodiment, the first engaging portion 5901 of each of the securing caps 590 is in a form of an opening, and the second engaging portion 595 of each of the second clamp components 592 is formed as a protrusion. When the second clamp component 592 is at the clamping position, the securing cap 590 can be pivoted toward the first clamp component 591 until the second engaging portion 595 engages the first engaging portion 5901, thereby locking the second clamp component 592 at the clamping position. The second clamping surface 598 of each second clamp component 592 is further formed with a recess 5920 adjacent to the second engaging portion 595, thereby making it convenient for a user to operate the securing cap 590 to disengage the first engaging portion 5901 from the second engaging portion 595. The seat assembly 30 further has a passageway 39 (see FIG. 8) formed transversely across the seat member 35 behind the armrests 37. When securing the child car seat 10 of this invention to the automobile seat, the lap belt of the seat belt of the automobile is extended through the passageway 39 to be locked in place, and the shoulder belt of the seat belt of the automobile is pulled into a tensioned state and clamped by a respective one of the belt clamps 59.

Referring to FIGS. 19 to 27, the seat assembly 30 further includes a recline adjustment mechanism 60 interconnecting the base member 15 and the seat member 35, and operable for controlling the pivoting movement of the seat member 13 relative to the base member 15 at a selected recline position. The recline adjustment mechanism 60 includes a stepped ramp 17, a recline paddle 65, an actuator handle 61, and a spring 19. The stepped ramp 17 is secured to the base member 15, and has a plurality of steps 18 and a plurality of positioning holes 181, each of which is formed between a corresponding adjacent pair of the steps 18. In this embodiment, the recline paddle 65 is connected pivotally to the seat member 35, and is formed with a pair of through holes 66 (see FIGS. 24 and 25) and a tip portion 67 opposite to the seat member 35. The actuator handle 61 is supported slidably on the base member 15, and is formed integrally with a pair of first paddle trap members 62 and a pair of second paddle trap members 63. The second paddle trap members 63 are spaced apart from the first paddle trap members 62, respectively. Both the first and second paddle trap members 62, 63 have an inclination angle that is approximate to that of the stepped ramp 17 so as to trap the tip portion 67 of the recline paddle 65 therebetween. The spring 19 is mounted on the base member 15 and is coupled to the actuator handle 61.

When adjusting recline of the seat member 35 relative to the base member 15, the actuator handle 61 is pulled forwardly to are leasing position (see FIG. 20) against the biasing force of the spring 19. Hence, the first paddle trap members 62 move together with the actuator handle 61 and push forwardly the recline paddle 65 away from the steps 18 of the stepped ramp 17, thereby permitting pivoting movement of the seat member 35 relative to the base member 15. After adjustment of the seat member 35 relative to the base member 15, the actuator handle 61 is released and is biased rearwardly by the spring 19 to an engaging position (see FIG. 19). Hence, the second paddle trap members 63 move together with the actuator handle 61, extend respectively into the through holes 66 in the recline paddle 65 and push rearwardly the recline paddle 65, such that the tip portion 67 of the recline paddle 65 engages a selected one of the steps 18 of the stepped ramp 17 so as to position the seat member 35 at a desired tilt position relative to the base member 15. Since the second paddle trap members 63 extend respectively through the through holes 66 in the recline paddle 65, and since both the second paddle trap members 63 have an inclination angle that is approximate to that of the stepped ramp 17, the tip 67 of the recline paddle 65 will be trapped against the selected one of the steps 18. In addition, the tip portion 67 of recline paddle 65 further has a rearwardly extending protrusion 68 (see FIGS. 26 and 27) for engaging a corresponding one of the positioning holes 181 so as to further secure the recline paddle 65 to the stepped ramp 17. In this embodiment, the seat member 35 is pivotable about the pivot shaft 36 relative to the base member 15 between three recline angle orientations: zero degree, five degrees and ten degrees. The steps 18 are disposed corresponding respectively to the recline angle orientations of the seat member 35. For example, the seat member 35 will be at the zero-degree recline angle orientation when the recline paddle 65 engages the lowermost one of the steps 18 (see FIG. 26), and at the ten-degree recline angle orientation when the recline paddle 65 engages the uppermost one of the steps 18 (see FIG. 27). By virtue of the recline adjustment mechanism 60, the seat member 35 can be selectively reclined to a desired recline angle orientation for the comfort of the child seated thereon.

Figure 2:
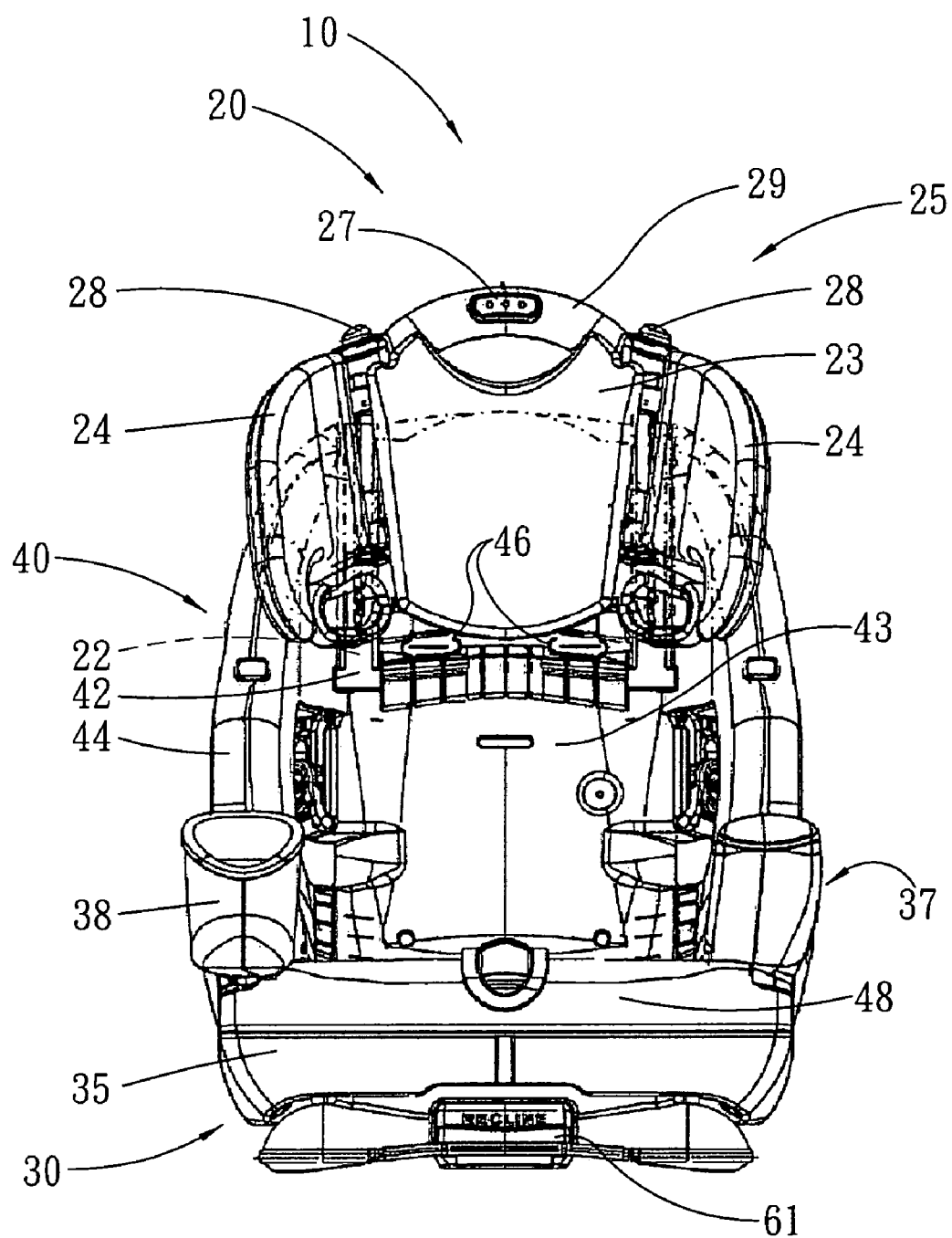
FIG. 2 is another fragmentary schematic front view of the preferred embodiment, illustrating the headrest unit at a lower position.
Figure 17:
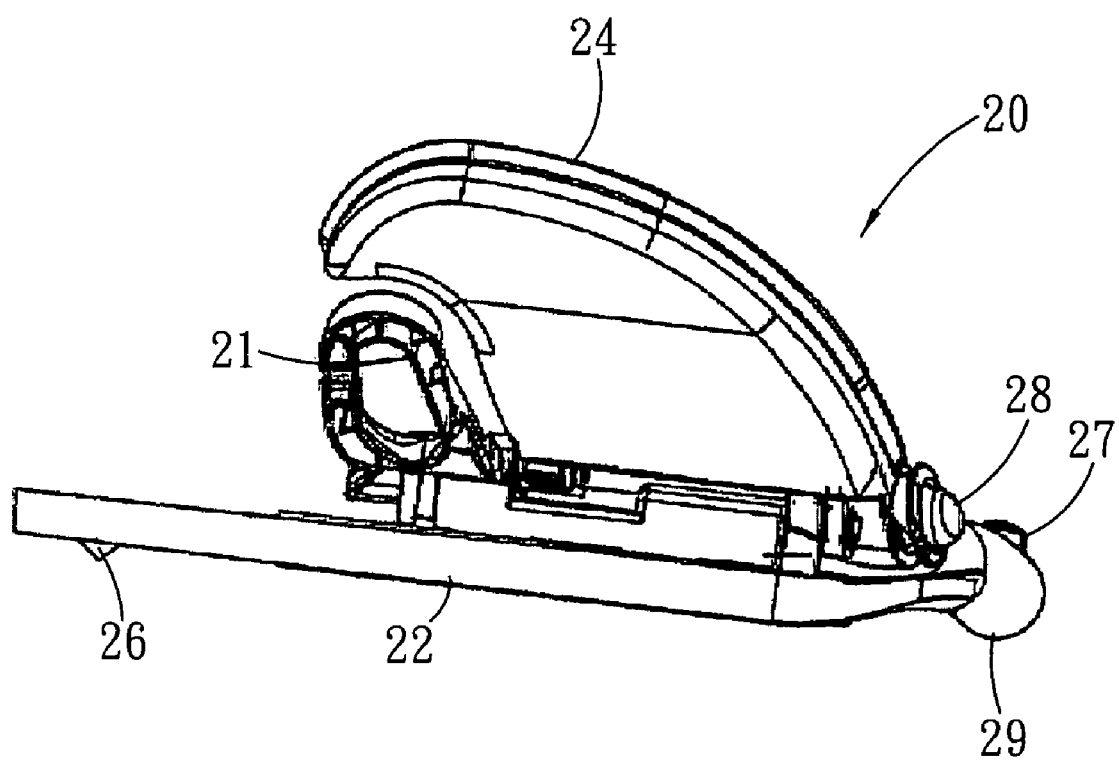
FIG. 17 is a schematic side view of the headrest unit.

Referring back to FIGS. 1, 2 and 18, and further referring to FIG. 17, the headrest unit 20 is coupled removably to the backrest body 43 of the backrest unit 40 to provide proper support for the child's head. The headrest unit 20 includes a headrest body 23 provided with a top handle 29 at a top end thereof, a pair of support rods 22, and a latching mechanism 25. The support rods 22 are fixed to the rear side of the headrest body 23 and engage slidably and respectively the channels 42 in the backrest body 43, such that the headrest body 23 is movable relative to the backrest body 43 along the channels 42 between a higher position (see FIG. 1) and a lower position (see FIG. 2) so as to be adapted to the growth of the child. The latching mechanism 25 is disposed for positioning the headrest unit 20 relative to the backrest body 43, and includes a pair of latch members 26 that are disposed respectively at bottom portions of the support rods 22, and that are engagable with openings (not shown) in the channels 42 to secure the support rods 22 within the channels 42, and an actuator button 27 that is mounted on the top handle 29 to control the engagement between the latch members 26 and the openings in the channels 42. A pair of retainer clips 42a (only one is visible in FIG. 18) are formed respectively in top ends of the channels 42. When the headrest body 23 is at the higher position, each of the retainer clips 42a engages a protrusion (not shown) on the bottom end of a respective one of the support rods 22 of the headrest unit 20 to prevent the headrest body 20 from being removed from the backrest body 43. The headrest unit 20 further includes a pair of lateral wings 24 extending respectively from lateral sides of the headrest body 23 in the same directions as the side wings 44 of the backrest unit 40. Preferably, each lateral wing 24 is pivotally connected to the headrest body 23 via a pivot mechanism 28 and can be positioned at a selected orientation relative to the headrest body 23 for the comfort of the child. The headrest unit 20 further includes a shoulder belt guide member 21 coupled co-movably to the headrest body 23 at a position beneath one of the lateral wings 24. The shoulder belt guide member 21 is formed with a slot (not shown) through which the shoulder belt of the automobile is extended into the shoulder belt guide member 21. The lowermost one pair of the belt slots 46 are located below the headrest body 23 when the headrest body 23 is at the lower position so as to permit extension of the safety belts 49 through the backrest body 43, as shown in FIG. 2.

To minimize the size of the shipping package, the child car seat 10 of this invention can be shipped in an unassembled configuration with the backrest unit 40 being removed from the seat assembly 30 as illustrated in FIG. 12. The child car seat 10 of this invention can also be shipped with the backrest unit 40 at the shipping position (see FIG. 11). Moreover, during the shipment of the child car seat 10, the headrest unit 20 can be positioned at the lower position, or even be removed from the backrest body 43 and placed on the front surface 431 of the backrest body 43 between the side wings 44.

If the child car seat 10 is shipped to a consumer in the unassembled condition, the consumer will need only to push the backrest unit 40 into engagement with the seat assembly 30 by snapping the mounting pins 51 respectively into the pin holes 33 in the seat assembly 30, such that the pivot locking mechanism 55 will automatically lock the mounting pins 51 respectively within the pin holes 33. Afterward, the backrest unit 40 can be pivoted about the mounting pins 51 into the operative position while the attachment arms 41 are locked respectively by the backrest locking mechanisms 50 within the receptacles 34 in the seat assembly 30. If the child car seat 10 is shipped with the backrest unit 40 at the shipping position, the customer will need only to pivot the backrest unit 40 into the operative position. If the headrest unit 20 is separated from the backrest unit 40 when the child car seat 10 is shipped to the customer, the headrest unit 20 can then be mounted onto the backrest unit 40 by sliding the supporting rods 22 into the channels 42 at the backrest body 43. Finally, the latching mechanism 25 is operated to position the headrest unit 20 at a desired height position relative to the backrest unit 40.

As the child grows in size, the child car seat 10 of this invention can be reconfigured to accommodate the child. For example, the headrest unit 20 is repositioned on the backrest unit 40, and the safety belts 49 are extended respectively through a higher pair of the belt slots 46. As the child grows to a stage where the harness is not necessary, the child car seat 10 can be operated to a high back booster mode where the seat belts of the automobile pass through the shoulder belt guide member 21 and the passageway 39 to secure the child fittingly.

Finally, if the child further grows, the backrest unit 40 can be removed from the seat assembly 30, so that the seat assembly 30 can then be utilized to a booster mode which elevates the child to allow the shoulder belts of the automobile to properly secure the child.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A child car seat adapted for use in an automobile to transport a child, said child car seat comprising:
   a seat assembly adapted for supporting the child thereon; and
   a backrest unit connected to said seat assembly and including
      a backrest body that has opposite front and rear surfaces, and a plurality of spaced-apart pairs of belt slots, each of said belt slots having opposite front and rear open ends formed respectively in said front and rear surfaces,
      a pair of safety belts, each of which has a free end portion,
      a guide component that is coupled to said rear surface of said backrest body and is stationary to stably cover said rear open ends of each of said belt slots and
      a hanger coupled to said rear surface of said backrest body at a position above said guide component,
      wherein said free end portions of said safety belts are extended respectively through a selected one pair of said belt slots, and along a predetermined route behind said rear surface of said backrest body through guidance of said guide component.

2. The child car seat as claimed in claim 1, wherein:
   said free end portion of each of said safety belts is extended around said hanger and downwardly from said hanger along the predetermined route.

3. The child car seat as claimed in claim 1, wherein said guide component of said backrest unit has a concaved portion abutting against said hanger.

4. The child car seat as claimed in claim 1, wherein:
   said backrest unit further includes a pair of attachment arms extending from said backrest body and coupled removably to said seat assembly; and
   said backrest body of said backrest unit is upright when said attachment arms are coupled to said seat assembly.

5. The child car seat as claimed in claim 4, wherein:
   said seat assembly has a pair of receptacles;
   said attachment arms of said backrest unit are retained removably and respectively in said receptacles; and
   said child car seat further comprises a pair of backrest locking mechanisms disposed respectively at said attachment arms of said backrest unit for locking releasably said attachment arms to said seat assembly.

6. The child car seat as claimed in claim 5, wherein:
   each of said receptacles in said seat assembly has a depression; and
   each of said attachment arms of said backrest unit is formed with an offset step engaging removably said depression in a respective one of said receptacles.

7. The child car seat as claimed in claim 5, wherein:
   said backrest unit further includes a pair of mounting pins projecting respectively from opposite lateral sides thereof; and
   said seat assembly further has a pair of pin holes for engaging respectively and removably said mounting pins of said backrest unit such that said backrest unit is pivotable about said mounting pins relative to said seat assembly.

8. The child car seat as claimed in claim 7, further comprising a pivot locking mechanism provided at a rearward portion of said seat assembly for retaining respectively said mounting pins of said backrest unit within said pin holes in said seat assembly, said pivot locking mechanism including a switch operable for removing respectively said mounting pins from said pin holes.

9. The child car seat as claimed in claim 1, further comprising a headrest unit coupled to said backrest body of said backrest unit, vertically movable relative to said backrest body, and including a latching mechanism for positioning said headrest unit at a desired height position relative to said backrest body.

10. The child car seat as claimed in claim 9, wherein at least one pair of said belt slots is located below said headrest unit when said headrest unit is positioned relative to said backrest body of said backrest unit at any desired height position.

11. The child car seat as claimed in claim 1, wherein said backrest unit further includes a pair of belt clamps mounted respectively to opposite lateral sides thereof, each of said belt clamps including a first clamp component and a second clamp component that is connected to said first clamp component, said second clamp component being pivotable relative to said first clamp component between a clamping position, where said second clamp component is adapted to cooperate with said first clamp component to clamp a seat belt of the automobile therebetween, and an open position, where the seat belt is released from said first and second clamp components.

12. The child car seat as claimed in claim 11, wherein:
   each of said belt clamps further includes a securing cap connected pivotally to an end of said first clamp component opposite to said second clamp component and having a first engaging portion, and
   said second clamp component of each of said belt clamps is formed with a second engaging portion engaging said first engaging portion of said securing cap for positioning said second clamp component at the clamping position.

13. The child car seat as claimed in claim 1, wherein said seat assembly includes a base member, a seat member connected pivotally to said base member and adapted for sitting of the child thereon, and a recline adjustment mechanism interconnecting said base member and said seat member and operable for controlling the pivoting movement of said seat member relative to said base member.

14. The child car seat as claimed in claim 13, wherein said recline adjustment mechanism of said seat assembly includes:
   a stepped ramp secured to said base member of said seat assembly and having a plurality of steps;
   a recline paddle connected pivotally to said seat member of said seat assembly; and
   an actuator handle supported movably on said base member, and movable between an engaging position, where said recline paddle engages a selected one of said steps of said stepped ramp so as to position said seat member at a desired tilt position relative to said base member, and a releasing position, where said recline paddle is disengaged from said stepped ramp so as to permit pivoting movement of said seat member relative to said base member.

15. The child car seat as claimed in claim 14, wherein said actuator handle further includes a paddle trap member for locking said recline paddle relative to said stepped ramp when said actuator handle is at the engaging position.

16. The child car seat as claimed in claim 15, wherein:
   said recline paddle of said recline adjustment mechanism is formed with a through hole; and said paddle trap member of said recline adjustment mechanism extends through said through hole in said recline paddle for maintaining said recline paddle at the selected one of said steps when said actuator handle is at the engaging position.

17. The child car seat as claimed in claim 14, wherein said recline paddle of said recline adjustment mechanism has a tip portion engaging the selected one of said steps of said stepped ramp when said actuator handle is at the engaging position.

18. The child car seat as claimed in claim 14, wherein said recline adjustment mechanism further includes a spring mounted on said base member of said seat assembly and coupled to said actuator handle for biasing said actuator handle to move toward the engaging position.

19. The child car seat as claimed in claim 1, wherein said seat assembly includes a seat member adapted for sitting of the child thereon, and a pair of armrests formed on said seat member, one of said armrests being formed with a cup holder.

20. The child car seat as claimed in claim 19, wherein:
said armrests of said seat assembly are formed respectively at opposite lateral sides of said seat member of said seat assembly; and
one of said armrests of said seat assembly has an inner side surface confronting the other one of said armrests and formed with a storing space therein.

* * * * *